Dec. 12, 1950     W. P. WILLS     2,533,656
RESISTOR

Original Filed Dec. 1, 1941

*INVENTOR.*
WALTER P. WILLS
BY Arthur H. Swanson
ATTORNEY

Patented Dec. 12, 1950

2,533,656

UNITED STATES PATENT OFFICE 2,533,656

RESISTOR

Walter P. Wills, Philadelphia, Pa., assignor, by mesne assignments, to Minneapolis-Honeywell Regulator Company, Minneapolis, Minn., a corporation of Delaware Original application December 1, 1941, Serial No. 421,173, now Patent No. 2,423,540, dated July 8, 1947. Divided and this application April 26, 1947, Serial No. 744,213

6 Claims. (Cl. 201—56)

The present invention relates to variable control devices for electrical circuits, and, more especially, to an improved form of slide-wire construction having particular utility for use in and as a part of a potentiometric measuring, recording and controlling instrument.

This invention is a division of my prior application Serial No. 421,173, filed December 1, 1941, now Patent No. 2,423,540, dated July 8, 1947. That prior application discloses electronic self-balancing potentiometer apparatus incorporating suitable means for causing the unidirectional potentiometric unbalance currents to produce a pulsating current flow of predetermined frequency in a detector circuit. The detector circuit includes an input transformer and electronic tubes for amplifying the pulsating current and for using the amplified current to control the operation of a reversible electric motor which, for the purpose of effecting rebalance of the apparatus upon unbalance thereof, is mechanically associated with the slide-wire assembly of the potentiometer circuit. Such apparatus has particular utility for measuring thermocouple voltage and other minute voltage changes, and is well adapted to furnish an accurate measure of the magnitude, or changes in magnitude, of any measurable condition, whether mechanical, chemical, physical, etc., giving rise to a small voltage indication of the value of the measurable condition.

Specific objects of the present invention are to provide an improved form of construction and operation of the slide-wire element per se, to provide a greater degree of convenience and efficiency of operation of the slide-wire in conjunction with the related units of a potentiometer instrument, and to provide a slide-wire construction in the form of a separate slide-wire assembly complete in itself for mounting in a frame in which other related parts, and in particular other related parts of a potentiometer instrument, may be mounted, thereby to facilitate the manufacture, assembly, and service of the slide-wire assembly unit as well as of the other related parts.

In a preferred embodiment, the slide-wire assembly unit of the present invention comprises a cylindrical support formed of insulating material upon which is helically wound a slide-wire resistance element and a collector element arranged in side by side relation. Bare wire of substantially the same gage is space-wound upon each of said slide-wire and collector elements. The slide-wire resistance element comprises an insulated wire upon which the bare wire is spaced wound. The collector element comprises a bare wire upon which the bare wire is space wound so that the last mentioned bare wire is electrically conductive throughout its length with the bare wire upon which it is wound. A rotary shaft provided with an arm adjustably carried by the shaft and extending along the exterior surface of the cylindrical support is concentrically mounted with respect to said support. In addition, a slot is provided in said arm parallel to the axis of the cylindrical support, and a roller is arranged for rolling movement in said slot for bridging the slide-wire resistance element and the collector element. Suitable means for rotating the shaft are also provided so that the position of the roller along the length of the slide-wire and collector elements may be adjusted as desired.

Other features of the preferred embodiment of the slide-wire assembly of the present invention comprise the provision of a terminal block located on one end of the cylindrical support, and also the provision of a shield for enclosing the slide-wire assembly to prevent stray magnetic or electrical fields from adversely affecting the slide-wire assembly.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

Figure 1:
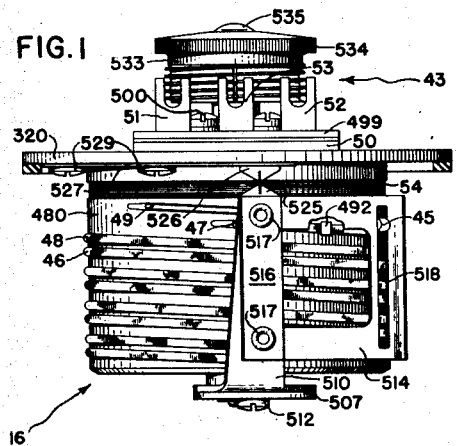
Fig. 1 is an elevational view of the slide-wire assembly of the present invention with the cover thereof removed.

As previously described, the novel slide-wire assembly of the present invention is well adapted for use in electronic self-balancing potentiometric measuring and/or controlling apparatus of the type disclosed in the aforementioned Willis patent. As shown in said patent, such apparatus advantageously comprises a potentiometric network including a slide-wire resistance assembly consisting of a slide-wire resistance element, a collector bar element, and a sliding contactor in bridging engagement with said elements and adjustable therealong. The output of the potentiometric network is determined by the position of the slide-wire contactor along the slide-wire element, and this output is connected in series with the unknown voltage to be measured in the input circuit of converting means which are operative to produce an alternating voltage signal representative of the difference between the potentiometric output and unknown voltages. This alternating voltage signal is then amplified by suitable amplifying means included in the apparatus, and is utilized in its amplified form to control the motor-drive portion of the apparatus which in turn controls the speed and direction of rotation of a reversible follow-up or rebalancing motor which forms a part of the apparatus. Said motor is suitably coupled to the aforementioned slide-wire contactor, and the apparatus is so constructed and arranged as to cause the rebalancing motor to impart to the slide-wire contactor whatever motions are necessary in order to maintain the apparatus balanced at all times, with the potentiometric network output voltage equal in magnitude and opposite in direction to the unknown voltage to be measured. Accordingly, the position of the slide-wire contactor along the slide-wire resistance element provides a continuous measure of the magnitude of the unknown voltage.

The slide-wire assembly of the present invention, in a form which renders it well suited for use in apparatus of the above-described type, is designated in Figs. 1 through 8 of the present application by the reference character 16. Broadly, the slide-wire assembly 16 includes a slide-wire resistance element 46, a collector bar element 48, and a cooperating sliding contactor 45. As will be described hereinafter, the slide-wire assembly also includes means adapted to be driven by the rebalancing motor of the associated apparatus and operative, when so driven, to position the contactor 45 along the elements 46 and 48 as necessary to maintain said apparatus in a balanced condition.

The details of construction of the slide-wire assembly 16 of the present invention will now be described. As shown, the assembly includes a cylindrical core 480 upon which the slide-wire resistance element 46, the collector bar element 48, and a resistance winding 54 are mounted. The core 480 is preferably made of ceramic material, such material being a good insulator and also having a temperature coefficient of expansion similar to that of the slide-wire resistance and collector bar. The inner surface of the cylindrical core 480 is provided with a shoulder 481 which is abutted by a plate 482. The plate 482 also abuts a shoulder 484 formed on a sleeve 483, and is held against the shoulder 484 by a lock washer 485 and a nut 486 secured on the sleeve 483. The sleeve 483 is provided with a shoulder 487 which abuts against the mounting plate 320, and the sleeve 483 is staked to the mounting plate 320. The cylindrical core member 480 is provided with a slot 488 which receives a pin 489 carried by the supporting plate 320 so that rotation of the cylindrical core member 480 with respect to the plate 320 is prevented. A rigid structure is thereby provided.

Figure 5:
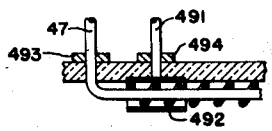
Figure 5:
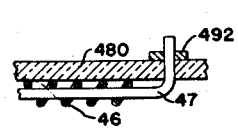
Figure 6:
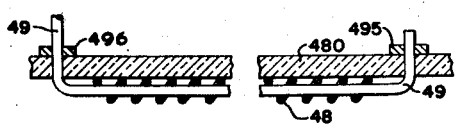

Figs. 5, 6, 7, and 8 show the manner in which the slide-wire 46 and the collector bar 48 are secured to the core member 480. The slide-wire 46, preferably made of manganin wire, is space wound on an insulated wire 47 such as Formex insulated manganin wire. The right-hand end of the slide-wire 46, as viewed in Fig. 5, is soldered to the wire 47 at a point thereon from which the insulation is removed to provide an electrical connection between the slide-wire 46 and the wire 47 at said point. A lead wire 491 is flattened at one end as shown at 492 in Figs. 5, 6 and 7, and this flattened end is wrapped around the other end of the slide-wire 46 and is soldered thereto to form an electrical connection between the slide-wire 46 and the lead wire 491. The slide-wire 46 is wrapped around the core member 480 and is located on the core member 480 in a groove. The wire 47 extends through holes in the core member 480, and washers 492 and 493, soldered to the wire 47, hold the wire 47 and hence the slide-wire 46 on the core member 480. In a like manner the lead wire 491 is held in place by a washer 494 soldered to the lead wire 491.

The collector bar is formed by space winding the manganin wire 48 around a manganin wire 49. Here, the wire 49 is not provided with insulation, so that the wires 48 and 49 are electrically conductive throughout their lengths. The collector bar is also wrapped around the core member 480 in a groove which is parallel with the groove containing the slide-wire 46. The wire 49 extends through openings in the core member 480, and washers 495 and 496, soldered to the wire 49, hold the wire 49 and hence the wire 48 in position on the core member 480. The core member 480 is also provided with a circumferential groove receiving the resistance winding 54.

The wire 49 of the collector bar and the wires 491 and 47 of the slide-wire extend upwardly through an opening in the mounting plate 320 to terminals 51, 52, and 53, respectively, carried by a terminal block 50. The terminals 51, 52, and 53, which are adapted to be connected to suitable points in the potentiometric network of the associated apparatus, are held in spaced relation by a spacer member 498 made of insulating material, and are clamped in place by means of screws 500 and a member 499, also made of insulating material.

Figure 2:
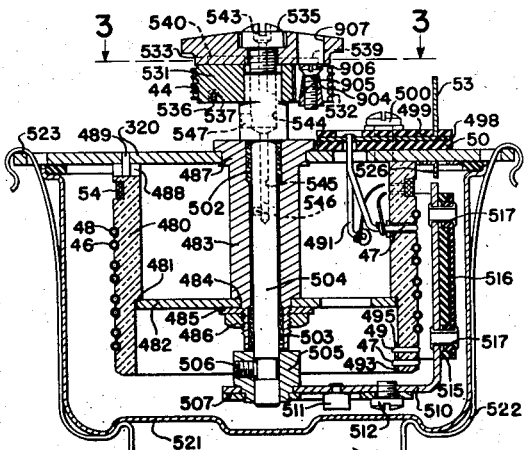
Fig. 2 is a vertical, sectional view of the slide-wire assembly.
Figure 4:
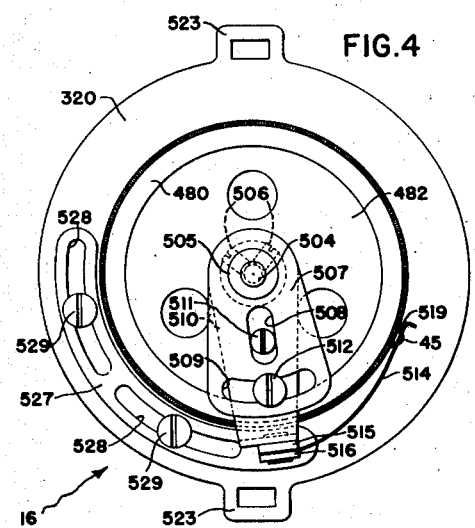
Fig. 4 is a bottom view of the slide-wire assembly with the cover thereof removed.

By winding the slide-wire 46 on the wire 47 in the manner just described, a loop is not formed and, therefore, there is no tendency for the slide-wire to pick up any stray electrical currents. Due to the fact that the leads between the slide-wire and collector bar and the terminals 51, 52 and 53 are extremely short, there is no tendency for these leads to pick up stray electrical currents. The resistance winding 54 is connected across the wires 47 and 491 by soldering as illustrated in Fig. 2. The resistance of the winding 54 is so selected that the total resistance of the slide-wire assembly is a predetermined value, to provide a universal slide-wire assembly.

The upper and lower ends of the sleeve 483 are provided with bushings 502 and 503, respectively, and rotatably mounted in these bushings is a shaft 504 provided with a shoulder adjacent its upper end to limit downward movement thereof. A collar 505 is secured to the lower end of the shaft 504 by means of a pair of set screws 506 contacting flattened portions on the shaft 504. The collar 505 therefore rotates with the shaft 504.

Staked to the collar 505 for rotation therewith is an arm 507 provided with a radial slot 508 and a circumferential slot 509. Rotatably mounted on the collar 505 between the arm 507 and the collar 505 is another arm 510. The arm 510 carries an eccentric 511 operating in the radial slot 508 so that the arm 510 may be angularly adjusted with respect to the arm 507. A screw 512 carried by the arm 510 is utilized for clamping the arm 510 to the arm 507 after adjustment to the desired position. A spring arm 514 is carried between two pieces of insulating material 515 and 516, and the spring arm and the pieces of insulating material are secured to the arm 510 by means of rivets 517. The spring arm 514 is provided with a vertical slot 518 in which is mounted the contactor 45. The contactor 45 comprises a cylindrical portion located in the vertical slot 518 and a shaft 519 engaging the inner surface of the spring member 514. Preferably the contactor 45 is made of silver which is softer than the manganin wire forming the collector bar and slide-wire 48 and 46, respectively. Any wear that takes place will take place on the contactor 45 and not on the slide-wire and the collector bar. When the shaft 504 rotates to cause the contactor 45 to slide along the slide-wire and the collector bar, the contactor 45 moves upwardly and downwardly in the vertical slot 518, and this upward and downward movement causes rotation of the contactor 45 about its shaft 519. Accordingly, as the shaft 504 is rotated, a new contact surface on the contactor 45 is continuously presented to the slide-wire and the collector bar. This assures a good wiping contact at all times.

The various parts of the slide-wire assembly 16 are enclosed in a case 521 which is held against the bottom surface of the mounting plate 320 by means of spring arms 522 carried by apertured ears 523. The case 521 not only protects the parts of the slide-wire assembly 16 from dirt and corrosive atmospheres but also acts as a shield to prevent stray electrical currents from affecting the operation of the slide-wire assembly. If desired, the cover 521 may be filled with oil for immersing the slide-wire assembly therein, and this procedure may be particularly desirable if the instrument is used in extremely corrosive atmospheres.

The upper end of the arm 510 is provided with a pointer 525 which cooperates with a relatively stationary pointer 526 carried by a bracket 527. The bracket 527 is provided with slots 528, and screws 529 extending through the slots 528 adjustably secure the bracket 527 to the underside on the mounting plate 320. When the associated instrument is calibrated at the factory for zero position, the marker on the pointer 526 is moved to line-up with the marker on the pointer 525, whereafter the bracket 527 is clamped in place by the screws 529. Accordingly, the position of the marker 526 indicates the zero position according to the factory calibration so that when the slide-wire assembly is disassembled for cleaning or repair purposes it can be readily restored to the original zero factory calibration.

Figure 3:
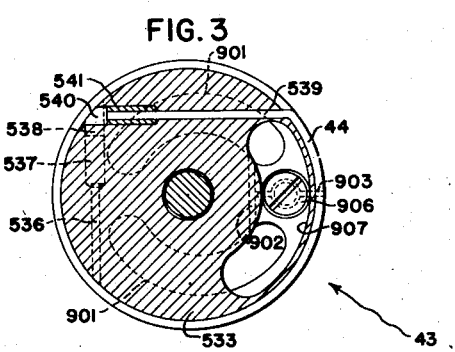
Fig. 3 is a detail sectional view of the cable drum of the slide-wire assembly taken substantially along the line 3—3 of Fig. 2.
Figure 7:
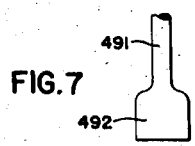
Figs. 5, 6, 7, and 8 are diagrammatic views showing the manner in which the slide-wire and collector elements are secured to the slide-wire assembly.
Figure 8:
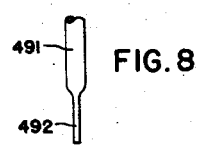

A cable drum 43 which operates the slide-wire assembly 16 is formed of two parts. The first part 531 is provided with cable grooves 532 and is rigidly secured to the shaft 504 as by a drive fit so that the part 531 always rotates with the shaft 504. The second part 533 is provided with a knurled edge 534 and is adjustably connected to the shaft 504 and the first part 531 by a screw 535. As seen in Figs. 2 and 3, the undersurface of the first part 531 is provided with a groove 536 and a hole 537. A cylindrical bushing 538 is secured to one end of a cable 44, as by soldering, and this bushing is inserted in the hole 537. The cable 44 extends along the slot 536 and then is wrapped around the first part 531 in the grooves 532. The cable then passes over the pulleys and a second cable drum, not shown, and then returns to the first part 531 being wrapped around the remaining grooves 532 thereof. Said second cable drum is adapted to be rotated by the rebalancing motor of the apparatus, not shown, whereby said motor imparts motion to the cable drum 43 through the cable 44.

The second end of the cable 44 is also provided with a bushing 541 suitably secured thereto, and this bushing 541 is inserted in a hole 540 formed in the second part 533. The cable 44 lies in a groove 539 also formed in the second part 533. By rotating the part 533 with respect to the first part 531, the effective length of the cable 44 is varied and, therefore, the tension of the cable 44 may be adjusted to the desired value. The screw 535 is then tightened to clamp the second part 533 in a fixed position with respect to the first part 531. Accordingly, the two-part cable drum 43 in addition to anchoring the ends of the cable 44 and driving the slide-wire 16 also forms a means for adjusting the tension of the cable 44. In order to facilitate this adjustment, the shoulder on the shaft 504 is provided with a hole 547 which lines up with a hole provided in the frame of the associated potentiometer apparatus, as shown at 548 in Fig. 11 of my aforementioned patent, when the slide-wire assembly is in the zero position. A pin may then be inserted through the said hole 548 into the hole 547 for holding the lower member 531 of the cable drum 43 stationary in the zero position while the upper member 533 is being adjusted to secure the proper tension in the cable 44.

In assembling the instrument, the slide-wire assembly is moved to the zero position and is held in that position by the pin extending through the holes 547 and 548. The second and unillustrated cable drum of the associated apparatus is then moved to the zero position, and the cable 44 is then wound in the grooves of the lower member 531 up to two grooves from the top, passed over the aforementioned pulleys and second cable drum, and then wound in the top groove of the lower member 531 and secured in the upper member 533. The upper member 533 is then rotated to secure the proper tension in the cable 44. The cable 44 is then secured to said second cable drum. This method of assembly accurately positions the slide-wire assembly 16 with respect to said second cable drum, and properly adjusts the cable tension. It will be noted that the bottoms of the grooves 532 are flat so that variations in the thickness of the cable 44 will not materially affect the effective length of the cable as would be the case if the grooves were V-grooves.

The lower member 531 is provided with a pair of arcuate eccentrically located holes 901; a cut 902 connecting the holes and a cut 903 connecting the cut 902 to the periphery of the lower member. These holes and cuts extend entirely through the lower member 531. The cut 903 is provided with a double taper hole 904 in which is located a conical wedge 905 and a screw 906. By tightening the screw 906 in the conical wedge 905, the conical wedge cooperates with the tapered hole 904 to spread the cut 903, this being permitted by the holes 901 and the cut 902. This increases the diameter or the circumference of the lower member 531. By properly adjusting the screw 906, the effective diameter or circumference of the cable drum 43 is adjusted, whereby the correct amount of movement of the slide-wire contactor 45 with respect to a predetermined movement of the cable 44 may be obtained. The upper member 533 is provided with a radial hole 907 so that the screw 906 may be accessible for adjustment purposes.

The screw 535 is provided with a longitudinal hole 543 which opens into holes 544 and 545 formed in the shaft 504. The lower end of the hole 545 communicates through a radial opening 546 with the chamber in the sleeve 483 between the bushings 502 and 503. These holes and openings are provided for the purpose of supplying oil for lubricating purposes to the bushings 502 and 503.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a slide-wire assembly, the combination of, a support, an insulated wire carried by said support, a bare wire space wound on said insulated wire, a bare wire carried by said support and spaced from and parallel to the insulated wire and of substantially the same gage as the insulated wire, a bare wire space wound on said second mentioned bare wire and electrically conductive throughout its length with the said bare wire and of substantially the same gage as the bare wire which is space wound on the insulated wire, a contact bridging the space wound bare wires and relatively movable with respect thereto, a terminal block having three terminals located on the support adjacent one end of the wires, a connection between one of the terminals and the near end of the insulated wire, a connection between another of the terminals and the near end of the bare wire which is space wound on the insulated wire, a connection between the opposite ends of the insulated wire and the bare wire space wound thereon, and a connection between the other terminal and the near end of the bare wire upon which is space wound the other bare wire.

2. In a slide-wire assembly, the combination of, a support, an insulated wire carried by said support, a bare wire space wound on said insulated wire, a bare wire carried by said support and spaced from and parallel to the insulated wire and of substantially the same gage as the insulated wire, a bare wire space wound on said second mentioned bare wire and electrically conductive throughout its length with the said bare wire and of substantially the same gage as the bare wire which is space wound on the insulated wire, and a contact bridging the space wound bare wires and relatively movable with respect thereto, said support being provided with openings and the ends of the spaced parallel wires extending through the openings and being secured therein to hold all of the wires in place on the support.

3. In a slide-wire assembly, the combination of, a cylindrical support formed of insulating material, a resistance wire helically wound on the exterior surface of the cylindrical support, a collector wire helically wound on the exterior surface of the cylindrical support and spaced from and parallel to the resistance wire, a rotary shaft concentrically mounted with respect to said cylindrical support, means for rotating the shaft, an arm carried by the shaft and extending along the exterior surface of the cylindrical support, an adjustable linkage connecting said arm to said shaft whereby said arm can be adjusted relative to said shaft, a slot in said arm parallel to the axis of the cylindrical support, and a roller rolling in said slot and bridging the resistance wire and the collector wire.

4. In a slide-wire assembly, the combination of, a cylindrical support formed of insulating material, a resistance wire helically wound on the exterior surface of the cylindrical support, a collector wire helically wound on the exterior surface of the cylindrical support and spaced from and parallel to the resistance wire, a rotary shaft concentrically mounted with respect to said cylindrical support, means for rotating the shaft, an arm adjustably carried by the shaft and extending along the exterior surface of the cylindrical support, a slot in said arm parallel to the axis of the cylindrical support, a roller rolling in said slot and bridging the resistance wire and the collector wire, a pointer carried by said arm, and a pointer adjustably carried by said support cooperating with the first mentioned pointer to indicate the zero position of the slide-wire assembly.

5. In a slide-wire assembly, the combination of, a cylindrical support formed of insulating material, a resistance wire helically wound on the exterior surface of the cylindrical support, a collector wire helically wound on the exterior surface of the cylindrical support and spaced from and parallel to the resistance wire, a rotary shaft concentrically mounted with respect to said cylindrical support, means for rotating the shaft, an arm carried by the shaft and extending along the exterior surface of the cylindrical support, a slot in said arm parallel to the axis of the cylindrical support, a roller rolling in said slot and bridging the resistance wire and the collector wire, and a shield enclosing the slide-wire assembly to prevent stray electrical fields from affecting the slide-wire assembly.

6. In a slide-wire assembly, the combination of, a cylindrical support formed of insulating material, an insulated wire helically wound on the exterior surface of the cylindrical support, a bare wire space wound on said insulated wire, a bare wire helically wound on the exterior surface of the cylindrical support and spaced from but parallel to the insulated wire and of substantially the same gage as the insulated wire, a bare wire space wound on said second mentioned bare wire and electrically conductive throughout its length with the said bare wire and of substantially the same gage as the bare wire which is space wound on the insulated wire, a rotary shaft concentrically mounted with respect to said cylindrical support, an arm adjustably carried by the shaft and extending along the exterior surface of the cylindrical support, a slot in said arm parallel to the axis of the cylindrical support, a roller rolling in the slot and bridging the space wound bare wires, a terminal block having three terminals located on one end of the cylindrical support adjacent one end of the wires, a connection between one of the terminals and the near end of the insulated wire, a connection between another of the terminals and the near end of the bare wire which is space wound on the insulated wire, a connection between the opposite ends of the insulated wire and the bare wire space wound thereon, and a connection between the other terminal and the near end of the bare wire upon which is space wound the other bare wire.

WALTER P. WILLS.

REFERENCES CITED

The following references are of record in the file of this patent:

UNITED STATES PATENTS

| Number | Name | Date |
|---|---|---|
| 1,744,592 | Terpening | Jan. 21, 1930 |
| 1,996,175 | Schellenger | Apr. 2, 1935 |
| 2,122,370 | Harrison et al. | June 28, 1938 |
| 2,368,710 | Hessey | Feb. 6, 1945 |